US009053464B2

(12) United States Patent
Touve

(10) Patent No.: US 9,053,464 B2
(45) Date of Patent: Jun. 9, 2015

(54) INFORMATION SECURITY METHOD AND APPPARATUS

(75) Inventor: Jeremy W. Touve, Valencia, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 964 days.

(21) Appl. No.: 12/587,057

(22) Filed: Sep. 30, 2009

(65) Prior Publication Data

US 2011/0078257 A1    Mar. 31, 2011

(51) Int. Cl.
*G06F 15/16* (2006.01)
*G06Q 10/10* (2012.01)
*H04L 12/58* (2006.01)
*H04L 29/06* (2006.01)

(52) U.S. Cl.
CPC ............ *G06Q 10/107* (2013.01); *H04L 12/583* (2013.01); *H04L 51/063* (2013.01); *H04L 63/02* (2013.01)

(58) Field of Classification Search
None
See application file for complete search history.

(56) References Cited

U.S. PATENT DOCUMENTS

| 6,662,198 | B2* | 12/2003 | Satyanarayanan et al. ........... 1/1 |
| 6,678,698 | B2* | 1/2004 | Fredell et al. ................. 707/608 |
| 6,941,478 | B2* | 9/2005 | Card et al. ...................... 726/24 |
| 7,127,741 | B2* | 10/2006 | Bandini et al. .................. 726/14 |
| 7,134,142 | B2* | 11/2006 | Smith ............................. 726/24 |
| 7,490,353 | B2* | 2/2009 | Kohavi ........................... 726/22 |
| 2004/0205653 | A1* | 10/2004 | Hadfield et al. .............. 715/530 |
| 2007/0005715 | A1* | 1/2007 | LeVasseur et al. ............ 709/206 |
| 2008/0256188 | A1* | 10/2008 | Massand ....................... 709/206 |
| 2010/0037324 | A1* | 2/2010 | Grant et al. .................... 726/27 |

* cited by examiner

*Primary Examiner* — Ranodhi Serrao
*Assistant Examiner* — Thomas Richardson
(74) *Attorney, Agent, or Firm* — Wall & Tong, LLP

(57) ABSTRACT

A method and apparatus for ensuring that important confidential or proprietary information is not inadvertently released through email and similar transmissions. When file security firewall resident on a file security server or another network node receives an email intended for transmission, it determines whether the file revision history should be removed from any attachments. If so, the email is buffered and the attachments are extracted for file revision history by a file revision history remover associated with the firewall or an available proprietary file revision history remover. Once the file revision history removal is attempted, successfully or unsuccessfully, a reformed email is created, including either the original attachments or, in their place, a version of the attachment from which file revision history has been removed.

14 Claims, 4 Drawing Sheets

INFORMATION SECURITY METHOD AND APPPARATUS

TECHNICAL FIELD

The present invention relates generally to the field of security in network communications, and, more particularly, to a method and apparatus for ensuring that important confidential or proprietary information is not inadvertently released through network transmissions.

BACKGROUND

Computers and computer networks are widely used for various types of communication. Email is an early network application, and it has evolved over the years. Email correspondents can send emails including attachments that have been prepared using another application. These emails may be sent to one or many recipients, including some that may work for other companies.

This has created a few concerns, as any email attachments may contain proprietary or confidential information that should not be sent to certain potential recipients, such as those that work elsewhere. The user or users sending emails with attachments must use care to remove this information prior to sending the email.

This, however, may lead to another problem. Some applications are able to produce documents, spreadsheets, presentations, or other files for which a record of changes or transmissions or changes is also retained. This file revision history may include the changes made by several users. In addition, it may often be optionally displayed along with the file if desired, or hidden to make the file easier to read. This creates the risk of inadvertently sending a file along with file revision history that, when made visible, reveals information that the correspondent had not meant to send.

For this reason, some programs are available to application users that remove the file revision history, which they can use prior to sending. Or this user could simply remove the file revision history manually and save the file as another, "clean" version. Unfortunately, these solutions are still problematic. In many cases a user could, for example, simply forget to remove the file revision history from a document prior to attaching it to an email, or the user may not even be aware that the file revision history exists. An inadvertent disclosure of confidential information could still occur.

Accordingly, there has been and still is a need to address the aforementioned shortcomings and other shortcomings associated with network transmissions, especially outbound transmission such as email with attached documents. These needs and other needs are satisfied by the present invention.

SUMMARY

The present invention to a method and apparatus for ensuring that important confidential or proprietary information is not inadvertently released through network transmissions, especially those involving attached files sent by email.

In one aspect, the present invention is directed to a method for processing email transmissions including receiving an email, determining whether file revision history removal is required, attempting to remove any file revision history from email attachments, if it is determined to be required, and forming a reformed email. The reformed email may include any attachments from which the file revision history was removed or did not need to be removed. Determining whether the file revision history removal is required may include determining whether the email includes any attachments, determining whether a file revision history removal flag has been set, or comparing email header information to a file revision history profile. The method may further include forwarding the reformed email toward its destination.

In another aspect, the present invention provides a method for processing email transmissions including buffering an email from an email originator, extracting attachments included in the email, if any, attempting to remove any file revision history from each attachment, and forming a reformed email including each attachment from which file revision history has been removed. The reformed email may include any attachments from which the file revision history was removed or did not need to be removed. The method may further include determining whether a proprietary file revision history remover should be used to attempt removal of the file revision history from an attachment and, if so, building and transmitting a revision file if it is determined that a proprietary file revision history remover should be used to attempt removal of the file revision history from an attachment. In this case the reformed email should include any attachment returned from the proprietary file revision history remover. The method may further include sending a notification to the email originator that the email has been forwarded in a reformed format.

In yet another aspect, the present invention is directed to a network node A network node including at least one network interface for receiving email transmissions from an email originator, a memory storage device for storing received emails, and a file security firewall, comprising a file revision history remover for attempting to remove the file revision history from any email attachments included in received emails and an email reformer for reforming the received email including any attachment from which the file revision history has been removed and any original attachments that contained no file revision history. The file security server may also serve as an email server or a network gateway.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a method and apparatus for ensuring that important confidential or proprietary information is not inadvertently released through network transmissions. As mentioned above, especially problematic are email transmissions that include attached documents.

Figure 1:
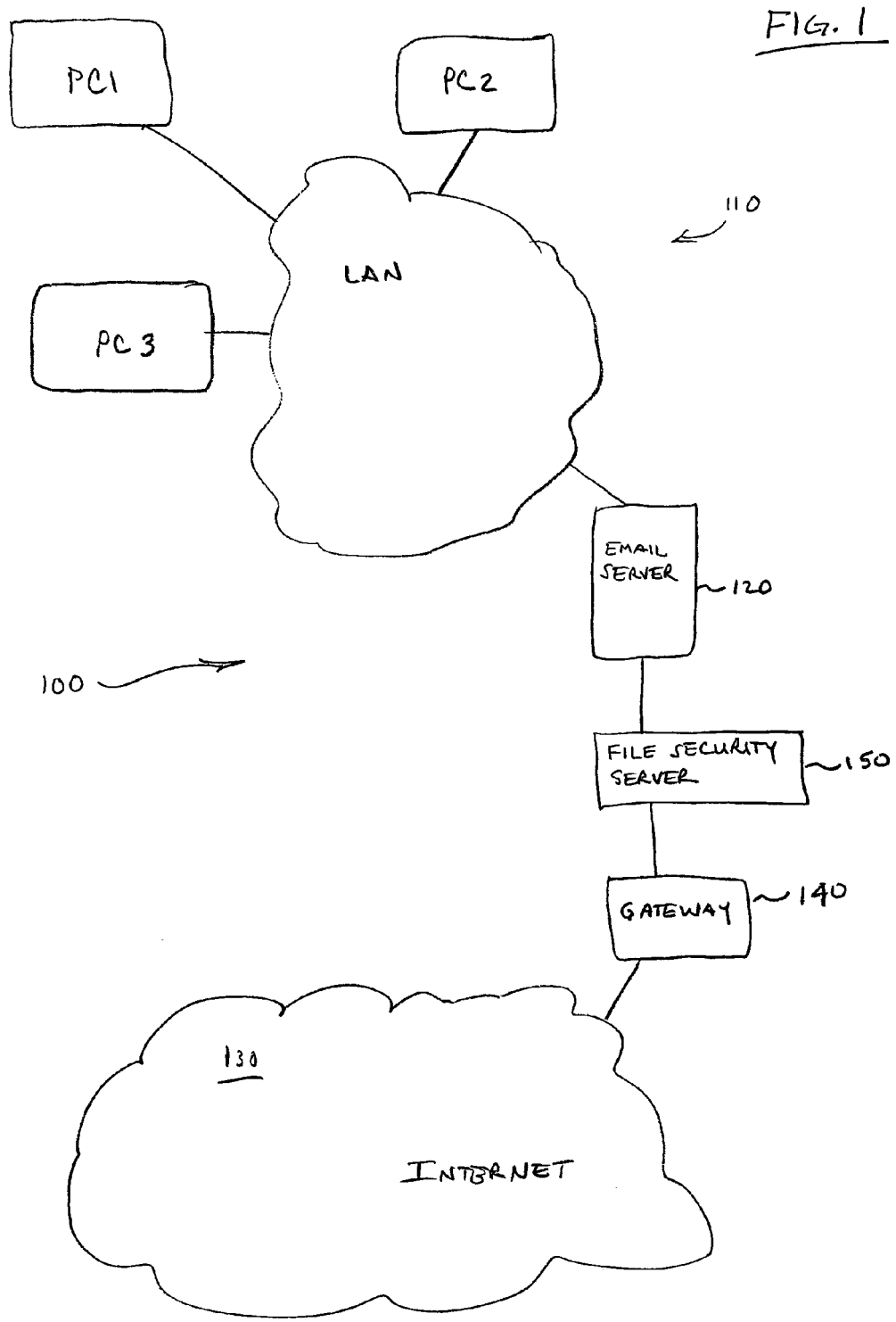
FIG. 1 is a schematic diagram illustrating selected components of a system configured according to an embodiment of the present invention.

FIG. 1 is a schematic diagram illustrating selected components of a system 100, configured according to an embodiment of the present invention. System 100 includes several PCs (personal computers), referred to in FIG. 1 as PC1 through PC3, arranged as part of a LAN (local area network) 110. Many enterprises use a LAN configuration, although many are larger than the one illustrated in FIG. 1. Users of PC1 through PC3 can use the LAN 110 for inter-office communications and to access networks exterior to the enterprise, such as the Internet.

One of the communication tools that can be used is email. As mentioned above, email applications allow the users to send textual and graphic information to others. Documents and other types of files, which are usually prepared using a non-email application, can be attached and sent for the use of the recipient, presuming that they have installed an application that can use the files as well.

In this embodiment, LAN 110, and consequently PC1 through PC3 as well, are in communication with an email server 120. When one of the PC users sends an email, email server 120 examines the email to determine the address or addressees, and forwards the email accordingly. If the email is address to a PC that is part of LAN 110, then it can simply be forwarded to that PC. If it is addressed to a recipient that is not part of LAN 110, in this embodiment the email is forwarded to the Internet 130 via gateway 140. In this embodiment gateway 140, among other tasks, properly addresses and formats the email message for transport via Internet 130. Note that in some embodiments (not shown), gateway 140 may be attached to other networks as well, and in that case perform an analogous function with respect to emails transmitted through those networks.

In accordance with the embodiment of FIG. 1, a file security server 150 is placed between email server 120 and gateway 140. To send an email via gateway 140 and the Internet 130, email server 120 forwards the email to file security server 150, which examines selected emails and their attached files, if any, and removes from selected attachments some or all of the file revision history that may be included within the files. The file security server 150 then forwards a reformed email message to gateway 140 for processing according to its normal function.

File security server 150 includes what is referred to herein as a file security firewall (not shown in FIG. 1), which handles the tasks associated with the selective file revision history removal. It is noted, however, that in other embodiments (not shown), the file security firewall may also reside on email server 120 or gateway 140 or on some other component not depicted in FIG. 1. If the file security firewall is resident on email server 120, or some other component that is part of LAN 110, it may also operate on emails routed within LAN 110 itself. In other alternate embodiments, more than one component may include a file security firewall. In the embodiment of FIG. 1, LAN email may be operated on by the file security firewall if the email server 120 is configured to forward it to file security server 150 with instructions to return the reformed file to the email server itself. In some embodiments, the email could all simply be routed through the Internet for delivery to the addressee.

In most embodiments, only outgoing email is processed by the file security firewall, but in some cases incoming emails may be operated on as well. In some cases it will also process non-email transmissions, either outbound or inbound, to the extent that an advantage is realized in doing so. In this regard, file security server 150 may also include standard incoming transmission firewalls to check for and block viruses, adware, spyware, etc.

Additional detail concerning the configuration of file security servers according to the present invention is provided below in reference to FIG. 4. The process of file revision history removal will now be discussed in greater detail.

Figure 2:
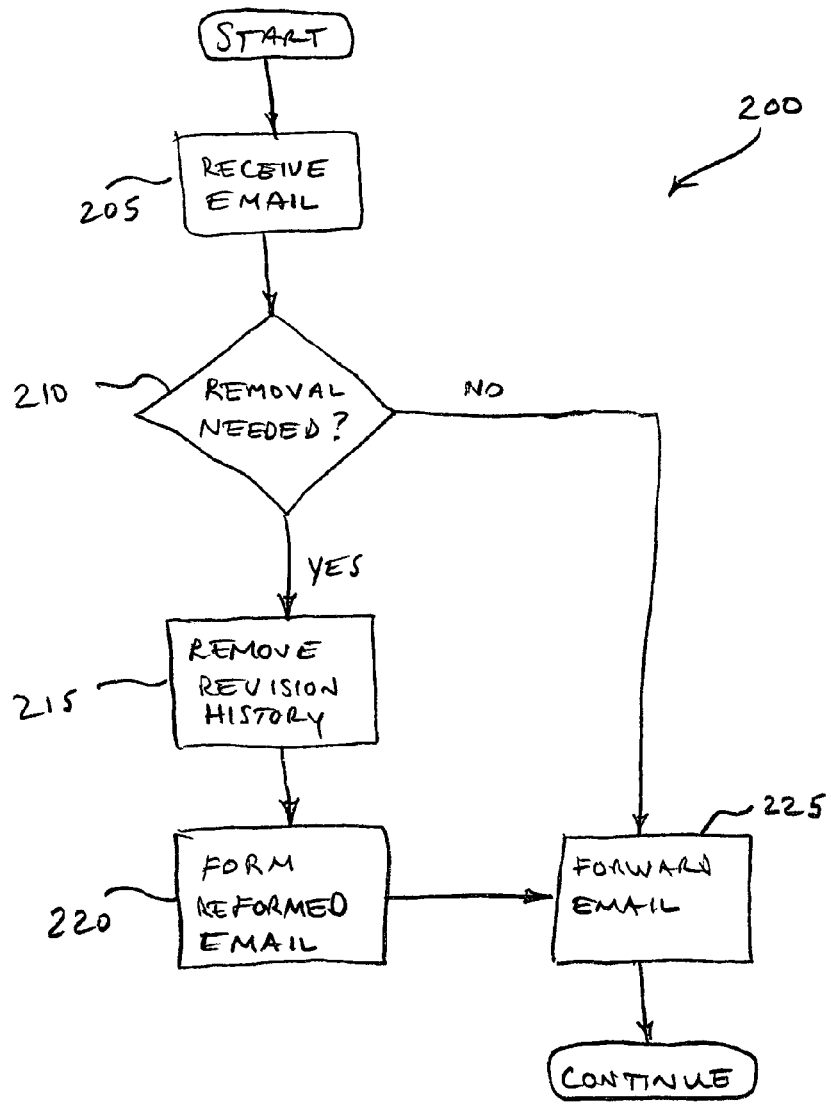
FIG. 2 is a flow diagram illustrating a method according to an embodiment of the present invention.

FIG. 2 is a flow diagram illustrating a method 200 according to an embodiment of the present invention. At START, it is presumed that the components necessary for executing the method 200 are available and operational. Note that, in reference to the discussion above, it does not matter on which component the file security firewall currently resides. The process then begins with the receipt of an email (step 205). When the email is received, a determination is made as to whether revision history removal is actually required. If not, the email is simply forwarded (step 225) using normal procedures. In the system 100 of FIG. 1, for example, it is forwarded to gateway 140, or in come cases returned to email server 120.

In determining whether file revision history removal is required, several factors may be considered. Initially it is noted that in some embodiments this determination may not be made at all, and all email messages are passed through the file security firewall operation. In terms of the embodiment of FIG. 2, this is equivalent to a positive decision at step 210. It is preferred, however, that at least some of the determination factors are considered.

If the email does not in fact include any attached files, then it may simply be forwarded at step 225; working through the rest of the process would simply be inefficient. In this regard, however, note that the term of "attachment" should broadly construed to include embedded files and another files being transmitted with the email, not just those that are labeled as "attached". In some implementations, it may also be possible to determine at the outset whether a particular file includes file revision history; if so, an email with attached files that have no file revision history may be treated the same as if they had no attachments at all.

Another consideration is whether the system is able to remove file revision history from the particular type of file that is attached. If not, then the email may be forwarded to step 225 for normal delivery (after any files that can be handled are taken care of). In this case, it may be desirable to first notify the sender of the email and wait for confirmation that forwarding in this manner is desired (steps not shown).

In some implementations, the email itself may by design include a flag indicating sender preference. In this way the user may indicate whether files that cannot be processed by the file security firewall should be forwarded as-is. The user may also indicate that the file security firewall should simply be by passed, as may often be the case. In these systems, however, it may be preferable to set the default to the option providing the highest degree of file security.

In some embodiments, provision may also be made for the establishment of file security firewall profiles, so that the various options for file revision history removal can be set. These preferences can be set, for example, according to the identity of the sender or the recipient, or both, in which case step 210 would include checking the email header information, for example the identity of the sender or recipients against the profile, as appropriate. Similarly, the profile may also include instructions as to how certain types of attached files should be dealt with.

In any case, in the embodiment of FIG. 2 if a determination is made at step 210 that removal is needed, then the file is passed to a file history removal module (see, for example, FIG. 4) and the file revision history is removed (step 215). A reformed email can then be formed (step 220), which includes as an attached file any file for which the file revision history has been removed. In this regard, note that when an email includes multiple attachments, the process should be performed for each of them. Once the email has been reformed, it is forwarded (step 225) according to the normal processes of the system.

Figure 3:
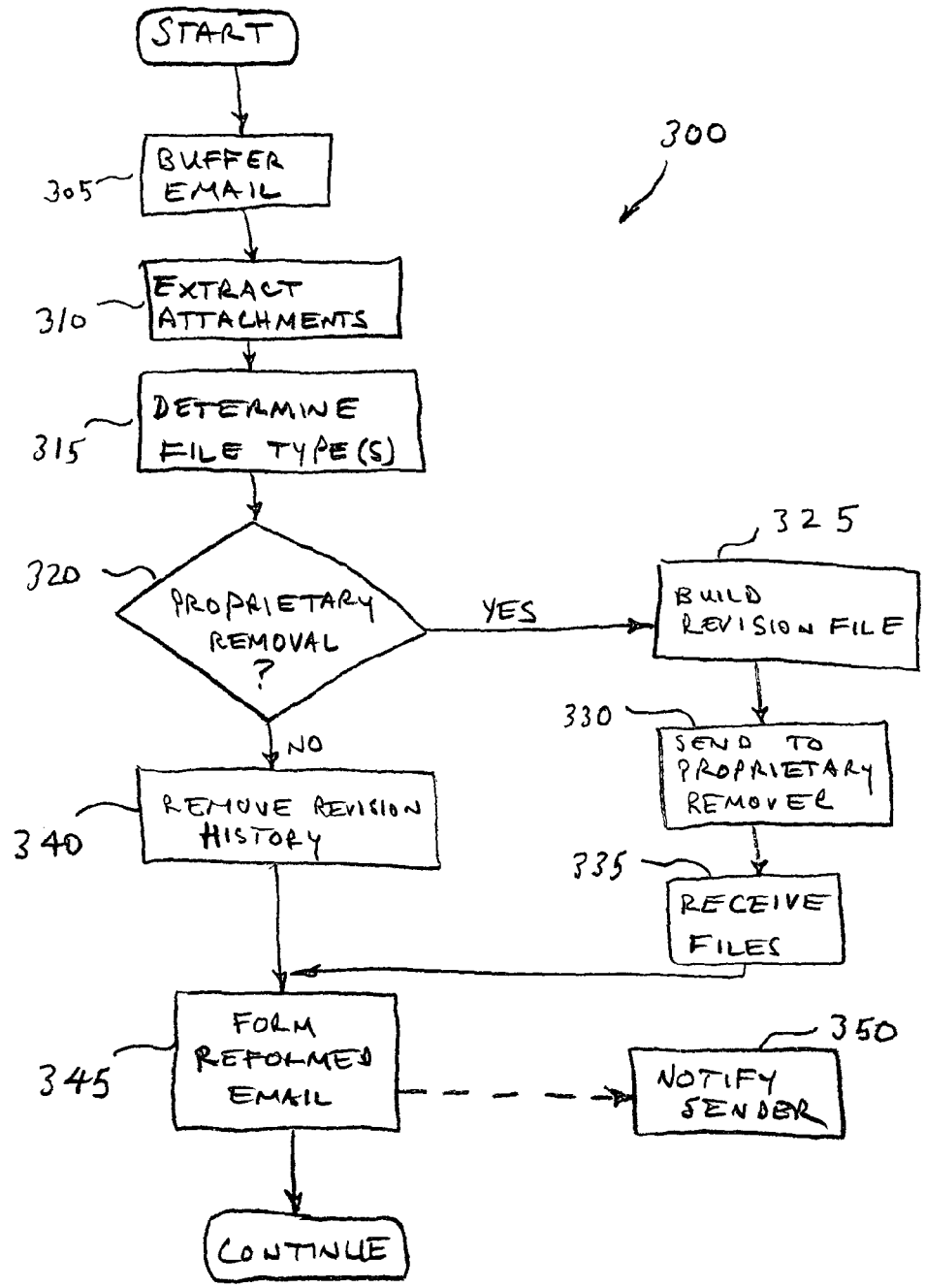
FIG. 3 is a flow diagram illustrating a method according to another embodiment of the present invention.

FIG. 3 is a flow diagram illustrating a method 300 according to another embodiment of the present invention. As with FIG. 2, at START it is presumed that the components necessary for performance of the process are available and operational. In this embodiment, it is also presumed that a determination to perform the revision history removal has been made, or simply that all emails are to be so processed. The process then begins with buffering the email (step 305) in a temporary memory storage device. The attached files, if any, are then extracted (step 310) and stored as well.

In the embodiment of FIG. 3, the file type is then determined (step 315). It is noted that in the embodiment of FIG. 2, described above, this may already have been performed as part of the determination process of step 210. If so, step 315 of FIG. 3 may be but is not necessarily omitted. In any case, once the file type in known, it is then determined whether a proprietary file revision history remover should be used. For some applications that preserve a file revision history, a file revision history remover is also provided, perhaps through a downloadable application, or one that is accessible via the Internet. For some applications use of the proprietary file revision history remover is mandatory, for others it may be optional. In any event, if the determination at step 320 is positive, then a revision file is built (step 325). This revision file includes at least the file for which proprietary file revision history is required, and may also include any instructions or other information necessary for the operation. The revision file is then sent to the proprietary file revision history remover for processing (step 330), and, when that has been completed, the processed files are received (step 335) by the file security firewall.

In it is determined at step 320 that proprietary file revision history removal is not required because no proprietary file revision history remover is available, or necessary, then the file security firewall itself removes the file revision history (step 340). Note that if the file security firewall is unable to do so, then the options discussed above with reference to method 200 can be considered (not shown in FIG. 3).

In the embodiment of FIG. 3, at this point a reformed email is formed. As used herein, a reformed email is one from which the original attachment files have been extracted (at step 310) and processed as described above before the processed files are attached to the original email. Note that in some cases, one or more of these files may be identical to the corresponding file that was extracted, for example because it the file revision history was for some reason not remove, but a determination was made to nevertheless transmit the file. Note also that in some cases, a reformed file will include attachments corresponding to some but not all of the original attachments. In some cases it may even omit the attachments entirely, for example if user confirmation indicates that the email should be sent without them. In this case, the file security firewall may build more then one version of the reformed file for selectively sending to different recipients.

Returning to the embodiment of FIG. 3, when the reformed file (or files) is formed, the process continues with regular email delivery. Optionally, the sender may be notified (step 350) of the results of the method, for example that the email was transmitted but with the file revision history in one or more of the attached files removed. In some embodiments (not shown), the original email and attachments may be archived to permit the user to simply respond that the original email should be forwarded as well. In other embodiment (also not shown), an email with the reformed attachments may be place in the users "sent mail" folder or similar location, either in addition to or as a replacement for, the original email stored there.

Note that the sequences shown in FIG. 2 and FIG. 3 are exemplary embodiments, and other embodiments are possible; each sequence may be performed in any logically-consistent order. In addition, in other embodiments some operations added, and in some cases even removed, without departing from the spirit of the invention.

Figure 4:
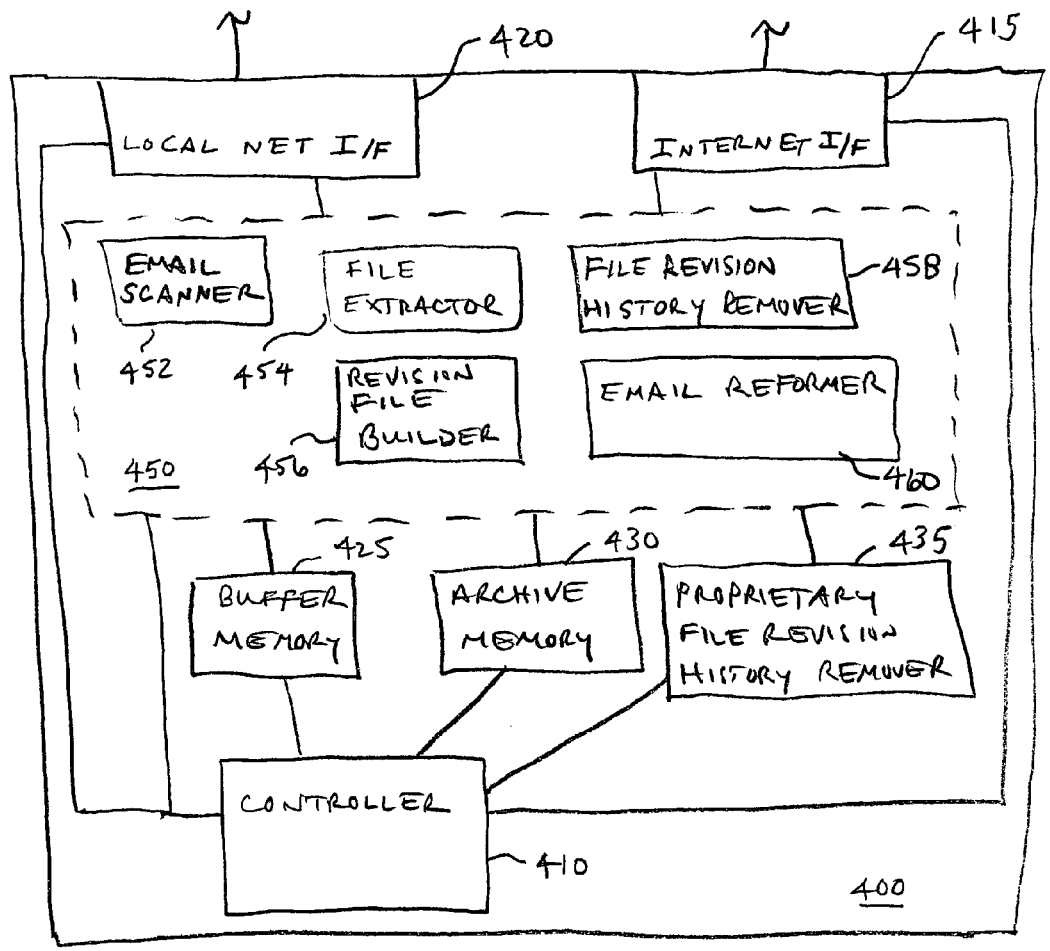
FIG. 4 is a block diagram illustrating selected components of a network file security server according to another embodiment of the present invention.

FIG. 4 is a block diagram illustrating selected components of a network file security server 400 according to another embodiment of the present invention. In this embodiment, file security server 400 includes a file security firewall 450. It is noted again that file security firewall 450 need not be resident in its own server; it may for example reside in a gateway or email server as well, or in some cases be resident in more than one component. In the embodiment of FIG. 4, the file security firewall operates under the control of controller 410 of server 400, but in other embodiments it may use its own controller (not shown).

In the embodiment of FIG. 4, fire security firewall includes an email scanner 452 for scanning incoming emails and a file extractor 454 for removing any attachments. It also includes a file revision history remover 458 for removing file revision histories from the extracted files, if it is able to do so. For other files, file history firewall 450 includes a revision file builder 456 for preparing files to send to the proprietary file revision history remover 435, which in this embodiment is also resident on file security server 400. Finally, in this embodiment file security firewall 400 also includes an email reformer for building reformed emails including attachments that have had their file revision histories removed, or in some cases the originally extracted files as appropriate. The operation these various components is described above in reference to FIG. 2 and FIG. 3.

File security server 400, in this embodiment, also includes a buffer memory for temporarily holding emails that are being processed by file security firewall 450, and an archive memory for longer term storage of selected emails. In the embodiment of FIG. 4, a local network interface for corresponding with a local network (for example LAN 110 shown in FIG. 1) and an Internet interface are also under the control of controller 410. Note that in other embodiments (not shown) the network interfaces may be configured differently to correspond to the local environment.

Note again the embodiment of FIG. 4 is exemplary, and in other embodiments, both file security server 400 and file security firewall may contain additional components, and in some embodiments some of the depicted components can be omitted.

In this manner, the present invention provides a manner of reforming emails by selectively removing, if possible, any file history revision history that they may contain. This has the advantage of being able to prevent to a large degree the disclosure of an proprietary or confidential information that may be resident in the file revision history.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for processing email transmissions, comprising:
   extracting one or more attachments associated with an email message;
   determining for each of one or more files of the one or more attachments whether a file revision history removal is required, wherein determining whether the file revision history removal is required comprises at least determining whether a file revision history removal flag indicating a sender's preference has been set;
   further determining, for each file requiring the file revision history removal, whether the file revision history is proprietary or non-proprietary;
   sending each file requiring the file revision history removal to a proprietary file revision history remover if the file revision history is proprietary, and to a file revision history remover if the file revision history is non-proprietary;
   processing each file requiring file revision history removal by removing the corresponding proprietary file revision history using the proprietary file revision history remover and by removing the corresponding non-proprietary file revision history using the file revision history remover to produce one or more processed attachments;
   reforming the email message by attaching any processed attachments and any extracted attachments containing no file revision history; and
   forwarding the reformed email message toward a corresponding email message destination.

2. The method of claim 1, further comprising forwarding the email message toward the destination if it is determined that the file revision history removal is not required for any of the one or more attachments.

3. The method of claim 1, wherein determining whether the file revision history removal is required further comprises determining whether the email includes any attachments not associated with a set file revision history removal flag.

4. The method of claim 1, wherein determining whether the file revision history removal is required further comprises comparing email header information to a file revision history removal profile.

5. The method of claim 1, further comprising sending a notification to an email originator that the email message has been forwarded in a reformed format.

6. The method of claim 5, further comprising sending a copy of the reformed email message to the email originator with the notification.

7. The method of claim 1, further comprising, prior to processing the determined file using said proprietary file history remover, sending a request to an email originator requesting confirmation that a proprietary file revision history removal should be performed and receiving a positive response from the email originator.

8. The method of claim 1, wherein forming the reformed email message further comprises including each original attachment for which the file revision history could not be removed.

9. The method of claim 1, wherein said proprietary file history remover is used to process the determined file in response to the further determining that the determined file includes the proprietary file revision history.

10. The method of claim 9, further comprising building and transmitting a revision file if it is determined that the proprietary file revision history remover should be used to attempt removal of the proprietary file revision history from the determined file.

11. The method of claim 10, wherein the revision file comprises at least the determined file required removal of the proprietary file revision history and instructions for said removal.

12. The method of claim 1, further comprising sending a notification to an email originator that a reformed email message has been forwarded in place of the original email.

13. The method of claim 1, wherein the one or more files include at least one email attached file and at least one email embedded file.

14. A network node, comprising:
   at least one network interface for receiving email transmissions from an email originator; and
   a file security firewall, for processing each received email message to provide a corresponding reformed email message for transmission toward a respective email destination, configure to perform:
   extracting one or more attachments associated with an email message;
   determining for each of one or more files of the one or more attachments whether a file revision history removal is required, wherein determining whether the file revision history removal is required comprises at least determining whether a file revision history removal flag indicating a sender's preference has been set;
   further determining, for each determined file required the removal of the file revision history, whether the file revision history is proprietary or non-proprietary;
   processing, based on said further determining, each determined file by removing the corresponding proprietary file revision history using a proprietary file revision history remover or by removing the corresponding non-proprietary file revision history using a file revision history remover, to produce one or more processed attachments;
   reforming the email message by attaching any processed attachments and any extracted attachments containing no file revision history.

* * * * *